(12) United States Patent
Jennings et al.

(10) Patent No.: US 6,522,434 B1
(45) Date of Patent: Feb. 18, 2003

(54) SYSTEM AND METHOD FOR DETERMINING OPTICAL LOSS CHARACTERISTICS OF OPTICAL FIBERS IN AN OPTICAL FIBER NETWORK

(75) Inventors: Mark Richard Jennings, Andover, NJ (US); Frank Salvatore Leone, Berkeley Heights, NJ (US); Richard Joseph Pimpinella, Hampton, NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/374,020

(22) Filed: Aug. 13, 1999

(51) Int. Cl.[7] ............................................... H04B 10/08
(52) U.S. Cl. ........................ 359/110; 359/125; 359/128
(58) Field of Search ................................. 359/110, 124, 359/125, 127, 128, 154, 173; 356/73.1

(56) References Cited

U.S. PATENT DOCUMENTS

| | | | | |
|---|---|---|---|---|
| 5,956,439 A | * | 9/1999 | Pimpinella | 385/16 |
| 5,995,687 A | * | 11/1999 | White | 385/14 |
| 6,177,985 B1 | * | 1/2001 | Bloom | 356/73.1 |
| 6,178,025 B1 | * | 1/2001 | Hardcastle et al. | 359/110 X |
| 6,263,136 B1 | * | 7/2001 | Jennings et al. | 385/48 |
| 6,317,535 B1 | * | 11/2001 | Jennings et al. | 385/24 |
| 6,366,724 B1 | * | 4/2002 | Jennings et al. | 385/48 |

* cited by examiner

Primary Examiner—Thomas Mullen
(74) Attorney, Agent, or Firm—Gibbons, Del Deo, Dolan, Griffinger & Vecchione

(57) ABSTRACT

A system and method for determining the optical loss characteristics of optical fibers in an optical fiber network. An optical transmission module is provided. The optical transmission module produces a light signal and an electrical signal that contains data regarding the characteristics of the light signal being generated. The light signal output of the optical transmitter module is connected to the input of a calibrated optical switch. The outputs of the optical switch are connected to the optical fibers that are to be tested. At the opposite ends of the optical fibers, a second optical switch is provided. The second optical switch connects the various optical fibers to a monitor module. The monitor module detects the light signal transmitted by the optical transmitter module through the various optical fibers. The monitor module converts the received light signal into a corresponding electrical signal. A systems controller is coupled to both the optical transmitter module and the monitor module.

18 Claims, 2 Drawing Sheets

SYSTEM AND METHOD FOR DETERMINING OPTICAL LOSS CHARACTERISTICS OF OPTICAL FIBERS IN AN OPTICAL FIBER NETWORK

RELATED APPLICATIONS

This application is related to the following U.S. Patent Applications:

U.S. patent application Ser. No. 09/432,057, entitled, INTEGRATED OPTICAL TRANSMITTER AND MONITOR MODULE, filed Oct. 30, 1999, issued on Apr. 2, 2002 as U.S. Pat. No. 6,366,724 B1.

U.S. patent application Ser. No. 09/430,548, entitled, INTELLIGENT OPTICAL TRANSMITTER MODULE, filed Oct. 29, 1999, issued on Jul. 17, 2001 as U.S. Pat. No. 6,263,136 B1.

U.S. patent application Ser. No. 09/430,640, entitled, MONITOR MODULE FOR A FIBER OPTIC MONITORING SYSTEM, filed Oct. 29, 1999.

BACKGROUND OF THE INVENTION

1. Field of the Invention

The present invention relates to systems that determine optical loss characteristics of optical fibers. More particularly, the present invention relates to systems and methods used to determine the optical loss characteristics of a particular optical fiber pathway in an optical fiber network by testing at only one point on the optical fiber pathway.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, equipment is used at the central office to organize the various optical fibers in the optical fiber network. In certain optical networks, the optical fibers at the central office are connected to dedicated pieces of equipment, such as optical signal transmitters, that serve only one purpose. If the optical fibers are to be connected to another piece of equipment, such as test equipment, the optical fibers must be manually connected to that new piece of equipment.

In more versatile applications, optical fibers are terminated at fiber administration systems at the central office. Fiber administration systems enable many different types of equipment to be connected to the optical fibers without having to reroute the optical fibers from their point of termination. Such fiber administration systems are exemplified by the LGX® fiber administration system which is currently manufactured by Lucent Technologies of Murray Hill, N.J., the assignee herein.

After optical fibers have been routed between the central office and the telecommunications provider and various ONUs, the optical fiber must be tested. Among the tests performed on newly laid optical cables is an optical loss test. For this test, a calibrated light source is used to transmit light signals through the optical fibers. The calibrated light source typically transmits test signals at the same frequencies that will be used in the optical fibers being tested. The calibrated light source is then measured at the far end of the optical fiber. After comparing the transmission signal to the received signal, the loss characteristics of each optical fiber can be quantified.

Typically, the testing for determining the loss characteristics of a particular optical pathway are done in two directions. In the first direction, loss testing is done from the telecommunication provider's facility to an ONU. In the second direction, the same optical fibers are tested from the ONU back to the telecommunication provider's facility. Each optical fiber exhibits different loss characteristics depending upon the direction of the signal transmission.

In order to perform loss characteristic testing, a technician is typically sent to the customer facility with a calibrated light source and signal monitoring equipment. A second technician with the same equipment remains at the telecommunication provider's facility. The two technicians then coordinate testing to obtain the loss characteristics of the optical fibers in both directions. Every time the optical cable is altered between the customer facility and the telecommunications facility, loss testing may again have to be initiated.

Calibrated light sources are extremely expensive. Furthermore, the use of two technicians to quantify a pair of optical fibers is a highly labor intensive and expensive procedure. Consequently, the prior art method of testing optical fibers requires a large commitment of time, labor and equipment. A need therefore exists for a system and method that can be used to determine loss characteristics of optical fibers without the need of a dedicated calibrated light source and without having to send a technician to a remote location.

SUMMARY OF THE INVENTION

The present invention is a system and method for determining the optical loss characteristics of optical fibers in an optical fiber network. An optical transmission module is provided. The optical transmission module produces a light signal and an electrical signal that contains data regarding the characteristics of the light signal being generated. The light signal output of the optical transmitter module is connected to the input of a calibrated optical switch. The outputs of the optical switch are connected to the optical fibers that are to be tested.

At the opposite ends of the optical fibers, a second optical switch is provided. The second optical switch connects the various optical fibers to a monitor module. The monitor module detects the light signal transmitted by the optical transmitter module through the various optical fibers. The monitor module converts the received light signal into a corresponding electrical signal.

A systems controller is coupled to both the optical transmitter module and the monitor module. Knowing the optical losses caused by the optical switches, the systems controller can compare data about the light signal from between the optical transmitter module and the monitor module, thereby determining the loss characteristics of the optical fibers between the optical transmitter module and the monitor module.

Depending upon the configuration of the optical fiber network, the optical transmitter module and the monitor module can be located either at the same facility or at remote facilities.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Figure 1:
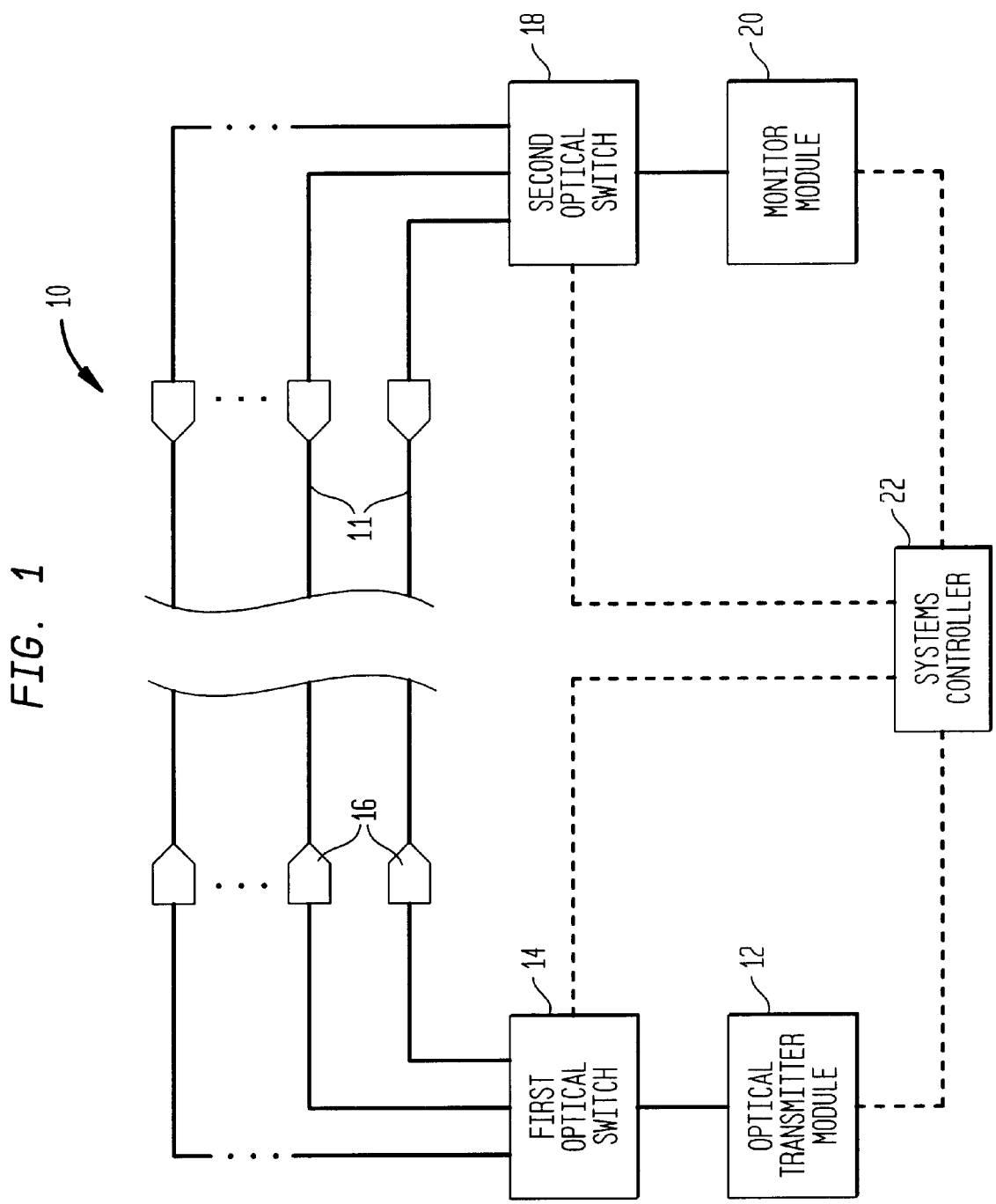
FIG. 1 is a schematic view of a first embodiment of the present invention system, illustrating its method of operation.

Referring to FIG. 1, it can be seen that the present invention system 10 does not utilize a traditional calibrated light source to test the various optical fibers 11. Rather, the calibrated optical light source is replaced with the specialized use of an optical transmitter module 12. The structure of an optical transmitter module is disclosed in copending U.S. patent application Ser. No. 09/430,640, entitled, Optical Transmitter Module For A Fiber Optic Monitoring System, and filed Oct. 29, 1999, the disclosure of which is incorporated into this application by reference.

The optical transmitter module 12 contains a laser light source, which produces a light signal. It is this light signal that is used to test the optical fibers 11. Within the optical transmitter module 12, a small sample of the light signal is tapped and is converted into a corresponding electrical signal. The electrical signal is read by an internal microprocessor. Accordingly, although the light emitted by the optical transmitter module 12 is technically not calibrated, the exact power and frequency characteristics of the light signal are constantly read to the microprocessor within the optical transmitter module 12, and are accessible by any external computer connected to the optical transmitter module 12.

The optical output of the optical transmitter module 12 is coupled to the input of a first optical switch 14. The optical switch 14 is calibrated so that the optical losses caused by the switch are known. An example of a suitable optical switch assembly can be found in co-pending U.S. patent application Ser. No. 08/935,220, entitled An Optical Switching Apparatus For Use In The Construction Mode Testing Of Fibers In An Optical Cable, filed Sep. 22, 1997, issued on Sep. 21, 1999 as U.S. Pat. No. 5,956,439, the disclosure of which is incorporated by reference.

The outputs of the optical switch 14 are joined to the various optical fibers 11 that are to be tested. If the optical fibers 11 are terminated on a fiber distribution shelf of a fiber administration system, each fiber would terminate with a connector module 16. The outputs of the first optical switch 14 are connected to the connector modules 16 at the telecommunication provider's facility.

Utilizing the first optical switch, the light signal from the optical transmitter module 12 can be selectively directed into any of the optical fibers 11 being tested. At the opposite side of optical fibers 11, the optical fibers 11 are again connected to an optical switch 18 that has known loss characteristics. The second optical switch 18 interconnects the various optical fibers 11 with a monitor module 20. The monitor module 20 receives the light signal from an optical fiber and converts that light signal into a corresponding electrical signal. The structure of the monitor module 20 is disclosed in related co-pending U.S. patent application Ser. No. 09/430,640, entitled, Monitor Module For A Fiber Optic Monitoring System, and filed Oct. 29, 1999, the disclosure of which is incorporated into this application by reference.

The optical transmitter module 12, the first optical switch 14, the second optical switch 18 and the monitor module 20 are all connected to a common systems controller 22, either directly or through a telecommunications link. The systems controller 22 coordinates the first optical switch 14 and the second optical switch 18 so that the light signal is passed through a targeted optical fiber from the optical transmitter module 12 to the monitor module 20. The systems controller 22 reads the characteristics of the light signal being generated by the optical transmitter module 12 and reads the losses of the two optical switches 14, 18. The systems controller 22 uses this information in the analysis of the light signal received by the monitor module 20. By comparing the light signal received by the monitor module 20 to the light signal transmitted, the systems controller 22 can calculate the loss characteristics of the optical fiber being tested. The full testing procedure can therefore be conducted in a fully automated manner, without the need of an on-site technician.

Figure 2:
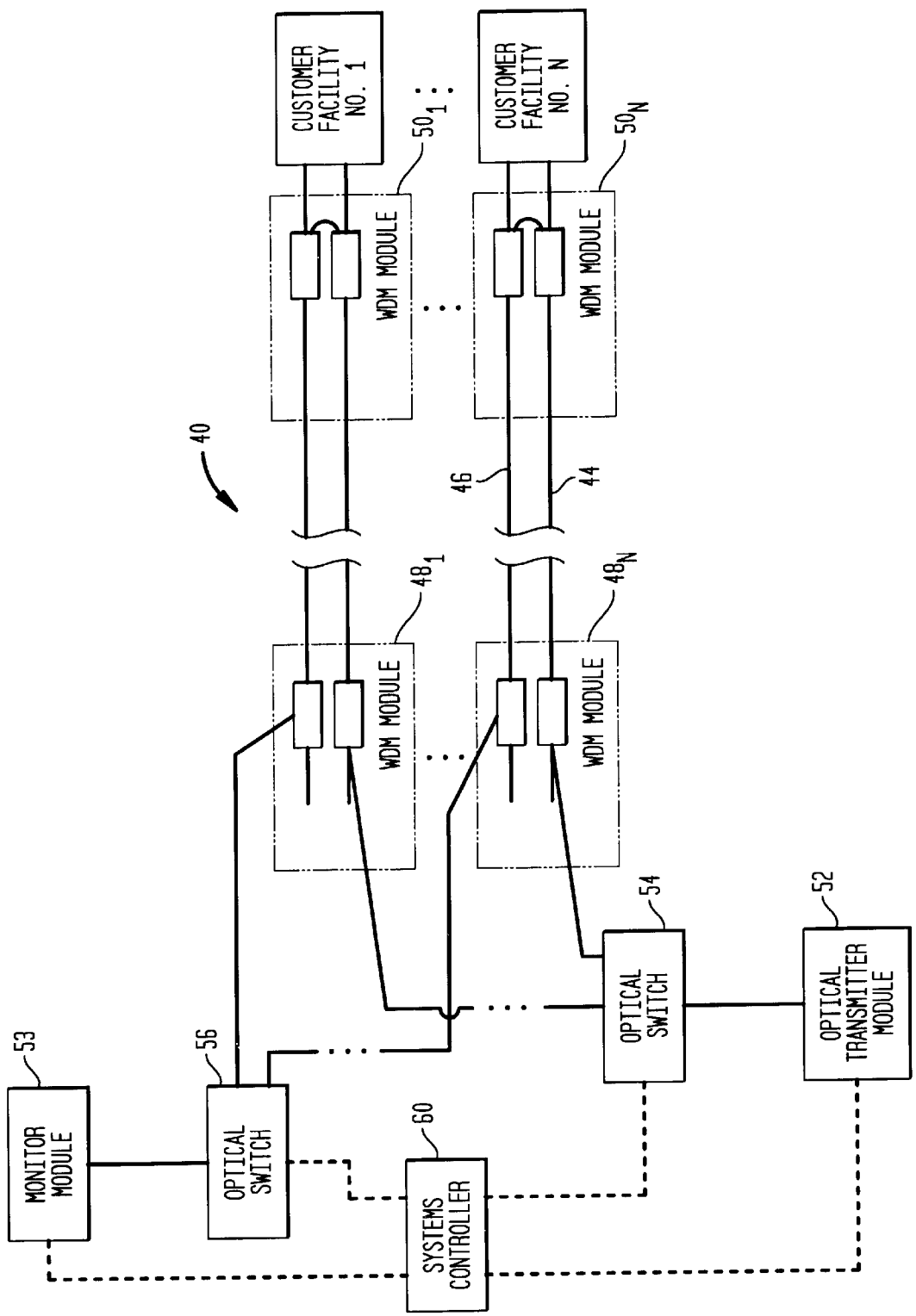
FIG. 2 is a schematic view of a second embodiment of the present invention system, illustrating its method of operation.

Referring to FIG. 2, an embodiment of the present invention system 40 is shown as part of an optical fiber network that utilizes loop back monitoring. In an optical fiber network that utilizes loop back monitoring, loop back monitoring shelves are contained within the fiber administration system at the telecommunication provider's facility. The structure and operation of a loop back monitoring shelf is disclosed in related copending U.S. patent application Ser. No. 09/374,169, entitled, System And Method For Monitoring Optical Fiber Integrity Between The Telecommunications Provider And A Customer's Premises, filed Aug. 13, 1999, the disclosure of which is also incorporated into this application by reference.

The present invention system 40 utilizes the components of the loop back monitoring shelf to perform optical loss testing. In a loop back monitoring system, optical fibers are matched in dedicated pairs. Each dedicated pair of optical fibers runs between the telecommunication provider's facility and a specific customer's premises. In FIG. 2, each dedicated pair of optical fibers 44, 46 that run between the telecommunication provider's facility and a customer's facility is terminated at both ends with a wavelength division multiplexing module $48_N$, $50_N$.

The shown system 40 contains an optical transmitter module 52 and a monitor module 53 of the type previously described and incorporated by reference. The output of the optical transmitter module 52 is coupled to the input of a first optical switch 54. The first optical switch 54 is calibrated so that the optical losses caused by the switch are known. The outputs of the first optical switch 54 are joined to the various wavelength division multiplexing modules $48_1$–$48_N$. As such, the optical transmitter module 52 can be selectively interconnected with any of the wavelength division multiplexing modules $48_1$–$48_N$ present in the system 40.

In an optical fiber network that utilizes a fiber administration system with loop back monitoring capabilities, the optical transmitter module 52 and the first optical switch 54 may be present as part of the system. Accordingly, the interconnection between the optical transmitter module 52 and the various wavelength division multiplexing modules $48_1$–$48_N$ is a matter of software control. However, in other systems, the first optical switch 54 may have to be manually added to the fiber administration system.

In FIG. 2, it can be seen that to test a pair of optical fibers 44, 46 in a first direction, the optical transmitter module 52 is connected to the first wavelength division multiplexing module $48_N$ by the first optical switch 54. From the first wavelength division multiplexing module $48_N$, the light signal is passed into the first optical fiber 44. The test signal passes the through the first optical fiber 44 until it arrives at the customer facility. Just prior to entering the customer's telecommunication equipment, the first optical fiber 44 passes into a second wavelength division multiplexing module $50_N$. In the second wavelength division multiplexing module $50_N$, the first optical fiber 44 is looped into the second optical fiber 46 at the test frequencies. Accordingly, at the second wavelength division multiplexing module $50_N$, the light signal is directed into the second optical fiber 46.

The light signal from the optical transmitter module 52 returns to the telecommunication provider's facility through the second optical fiber 46. The light signal returns to the same wavelength division multiplexing module $48_N$ at the telecommunication provider's facility. In the first wavelength division multiplexing module $48_N$, the light signal is directed to a second optical switch 56. The second optical switch 56 interconnects the different wavelength division multiplexing modules $48_1$–$48_N$ with the monitor module 53. The monitor module 53 converts the light signal into an electrical signal that can be read and analyzed by computer.

The optical transmitter module 52, the first optical switch 54, the second optical switch 56 and the monitor module 53 are all connected to a common systems controller 60, either directly or through a telecommunications link. The systems controller 60 coordinates the first optical switch 54 and the second optical switch 56 so that the light signal is passed through a targeted optical fiber from the optical transmitter module 52 to the monitor module 53. Since the systems controller 60 reads the characteristics of the light signal being generated by the optical transmitter module 52 and reads the losses of the two optical switches, the systems controller 60 can use this information in the analysis of the light signal received by the monitor module 53. By comparing the light signal received by the monitor module 53 to the light signal transmitted, the systems controller 60 can calculate the loss characteristics of the optical fiber being tested. The full testing procedure can therefore be conducted in a fully automated manner.

To obtain a loss characteristic for the same two optical fibers 44, 46 in a second direction, the interconnections between the first wavelength division multiplexing module $48_N$ and both the monitor module 53 and the optical transmitter module 52 are reversed. As such, the optical transmitter module 52 is connected to the second optical fiber 46 and the monitor module 53 is connected to the first optical fiber 44. The described procedure is then again performed and the loss characteristics of the various optical fibers is obtained in the opposite direction.

It will be understood that the embodiment of the present invention system and method specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. A method of determining optical loss characteristics in optical fibers, comprising the steps of:
    providing an optical transmitter module containing a light source that produces a light signal and an internal monitor for quantifying said light signal;
    coupling said optical transmitter module to a first end of at least some of said optical fibers with a first optical switch, wherein said first optical switch can selectively direct said light signal to any of the optical fibers connected thereto;
    providing an optical monitor for detecting said light signal;
    coupling said optical monitor to a second end of at least some of said optical fibers with a second optical switch; and
    coupling said optical transmitter module and said optical monitor to a common systems controller, wherein said systems controller compares the light signal from said optical transmitter module to the light signal detected by said optical monitor and calculates loss characteristic of the optical fiber through which the light signal passed.

2. The method according to claim 1, wherein said optical monitor and said optical transmitter module are at remote locations.

3. The method according to claim 1, further including the step of looping two of said optical fibers together at a remote location, thereby creating a single optical pathway from a first optical fiber and a second optical fiber of said optical fibers.

4. The method according to claim 3, wherein said step of coupling said optical transmitter module to a first end of at least one of said optical fibers includes coupling said first optical switch to the first end of said first optical fiber.

5. The method according to claim 4, wherein said step of coupling said optical monitor to a second end of at least some of said optical fibers, includes coupling said second optical switch to the first end of said second optical fiber.

6. The method according to claim 5, wherein said step of coupling said first optical switch to the first end of said first optical fiber, includes the substeps of:
    coupling a first wavelength division multiplexer to the first optical fiber;
    coupling said first optical switch to said wavelength division multiplexer, wherein said first wavelength division multiplexer introduces the light signal to the first optical fiber.

7. The method according to claim 6, wherein said step of coupling said second optical switch, includes the substeps of:
    coupling said first wavelength division multiplexer to the second optical fiber;
    coupling said second optical switch to said first wavelength division multiplexer, wherein said first wavelength division multiplexer removes the light signal from the second optical fiber.

8. The method according to claim 5, wherein said step of looping two of said optical fibers together at a remote location, includes coupling a wavelength division multiplexer to the first optical fiber and the second optical fiber at said remote location, wherein said wavelength division multiplexer removes said light signal from the first optical fiber and loops said light signal into the second optical fiber.

9. The method according to claim 1, further including the step of coupling said first optical switch and said second optical switch to said systems controller, wherein said systems controller selectively controls said first optical switch and said second optical switch.

10. The method according to claim 9, wherein said first optical switch and said second optical switch have optical loss values and said systems controller reads said optical loss values from said first optical switch and said second optical switch.

11. A system for testing optical loss characteristics of optical fibers that are received by a specific customer facility through the optical fiber network of a telecommunications provider, said system comprising:
    an optical transmitter module containing a light source that produces a light signal and an internal monitor for quantifying said light signal;
    a first optical switch coupled to said optical transmitter module, said first optical switch coupled to at least some of said optical fibers, wherein said first optical switch can selectively direct said light signal to any of the optical fibers connected thereto;
    an optical monitor for detecting said light signal;
    a second optical switch coupling said optical monitor to a second end of at least some of said optical fibers, said optical transmitter module and said optical monitor coupled to a common systems controller, wherein said systems controller compares the light signal from said optical transmitter module to the light signal detected by said optical monitor and calculates loss characteristic of the optical fiber through which the light signal passed.

12. The system according to claim 11, wherein said optical monitor and said optical transmitter module are at remote locations.

13. A system for testing optical loss characteristics of optical fibers that are received by a specific customer facility through the optical fiber network of a telecommunications provider, said system comprising:

an optical transmitter module containing a light source that produces a light signal and an internal monitor for quantifying said light signal;

an optical signal monitor for detecting said light signal;

a first wavelength division multiplexer coupled to said pair of optical fibers, said optical transmitter module and said optical signal monitor, wherein said first wavelength division multiplexer introduces said light signal into a first optical fiber of said pair of optical fibers and said first wavelength division multiplexer directs said light signal from a second of said pair of optical fibers to said optical signal monitor; and a second wavelength division multiplexer coupled to said pair of optical fibers, wherein said second wavelength division multiplexer loops said light signal from the first of said pair of optical fibers to the second of said pair of optical fibers.

14. The system according to claim 13, wherein said second wavelength division multiplexer is located at the customer facility.

15. The system according to claim 14, wherein said optical transmitter module and said optical signal monitor are contained within said fiber administration system.

16. The system according to claim 15, further including a second optical switch disposed between said optical signal monitor and said first wavelength division multiplexer.

17. The system according to claim 13, wherein said pair of optical fibers terminate at a fiber administration system in the central office of the telecommunications provider.

18. The system according to claim 13, further including a first optical switch disposed between said optical transmitter module and said first wavelength division multiplexer.

* * * * *